Jan. 17, 1967 P. ISAAC 3,298,142
REELABLE REVERSIBLY FLEXIBLE AND RIGID STRUCTURAL MEMBERS
Filed Aug. 19, 1964 6 Sheets-Sheet 1
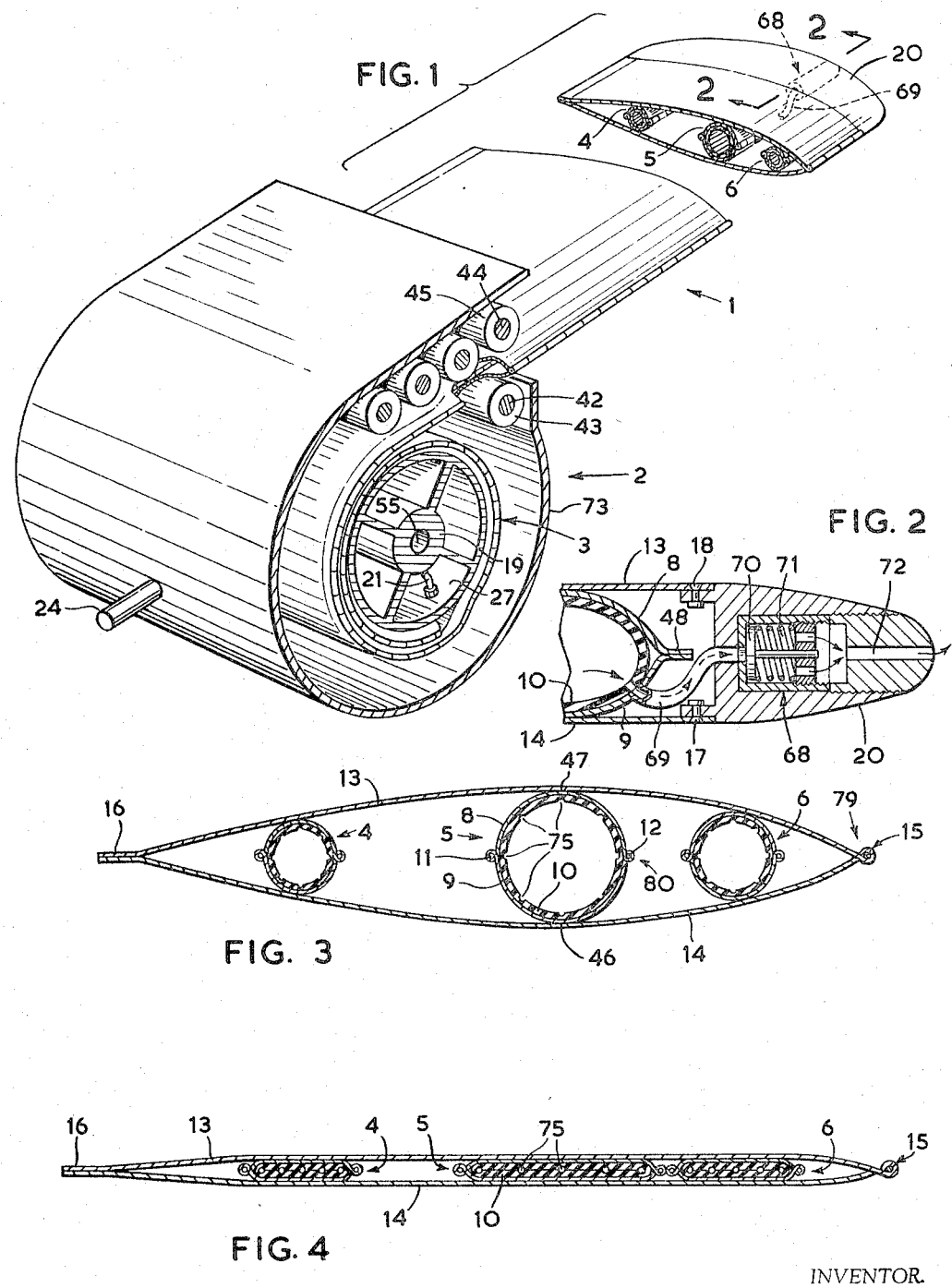
INVENTOR.
PETER ISAAC Jan. 17, 1967    P. ISAAC    3,298,142
REELABLE REVERSIBLY FLEXIBLE AND RIGID STRUCTURAL MEMBERS
Filed Aug. 19, 1964    6 Sheets-Sheet 2
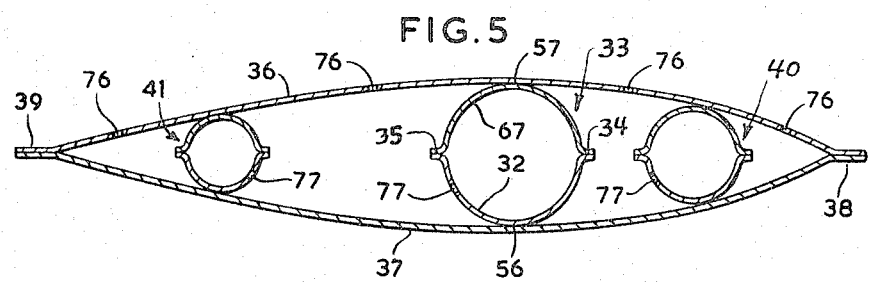
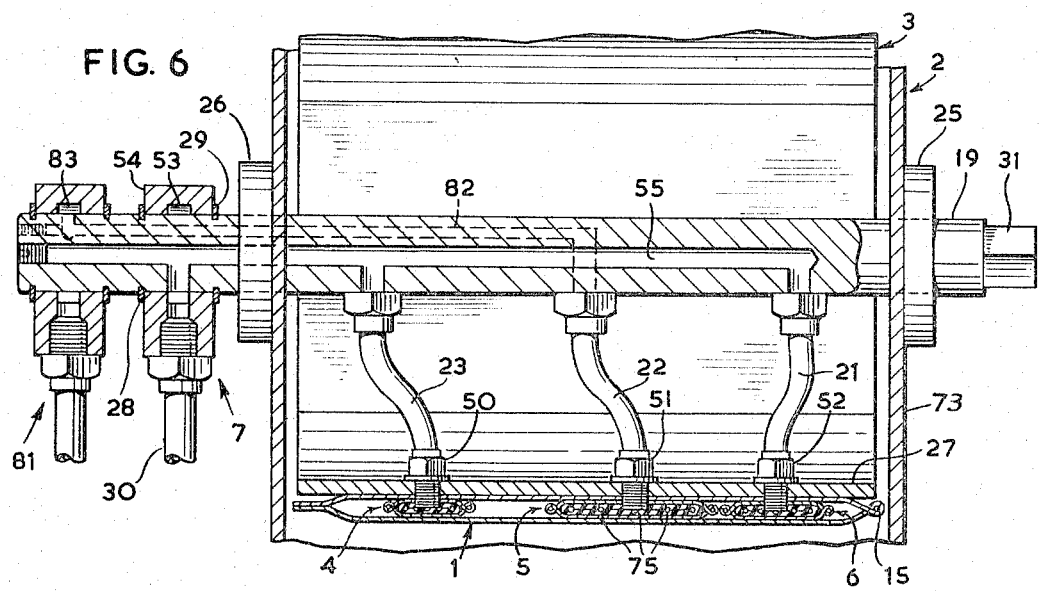
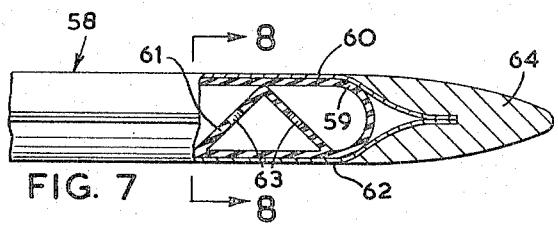
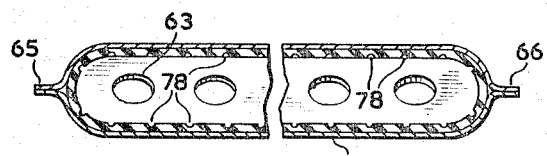
INVENTOR.
PETER ISAAC

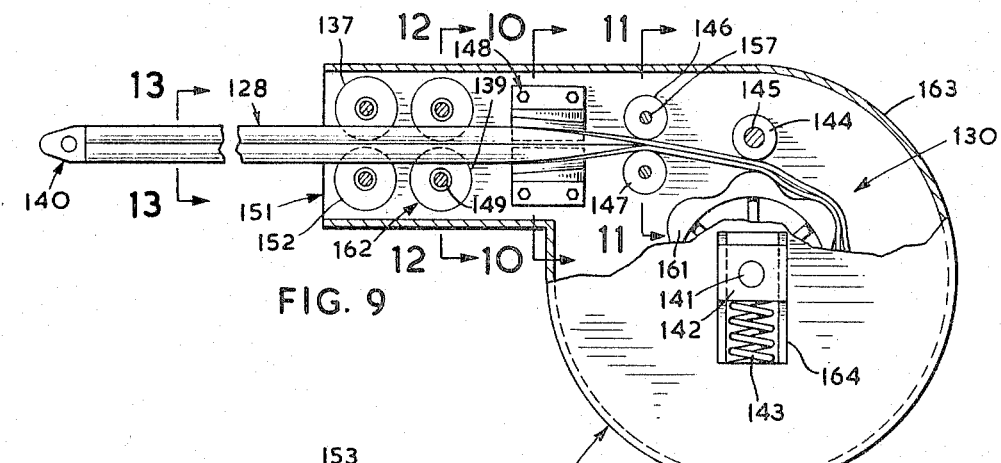
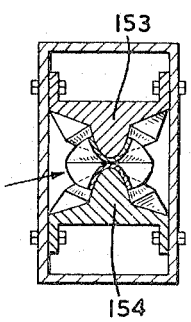
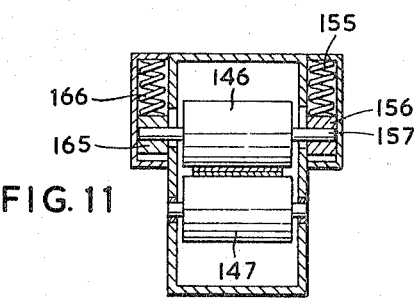
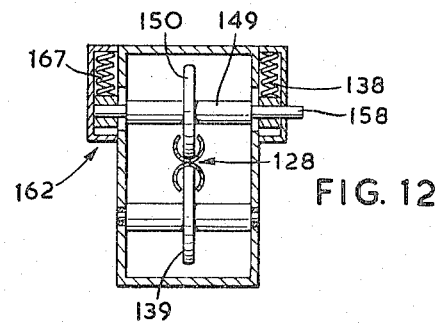
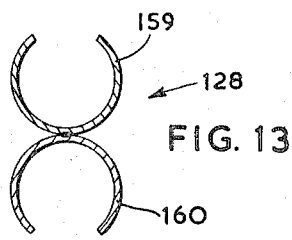

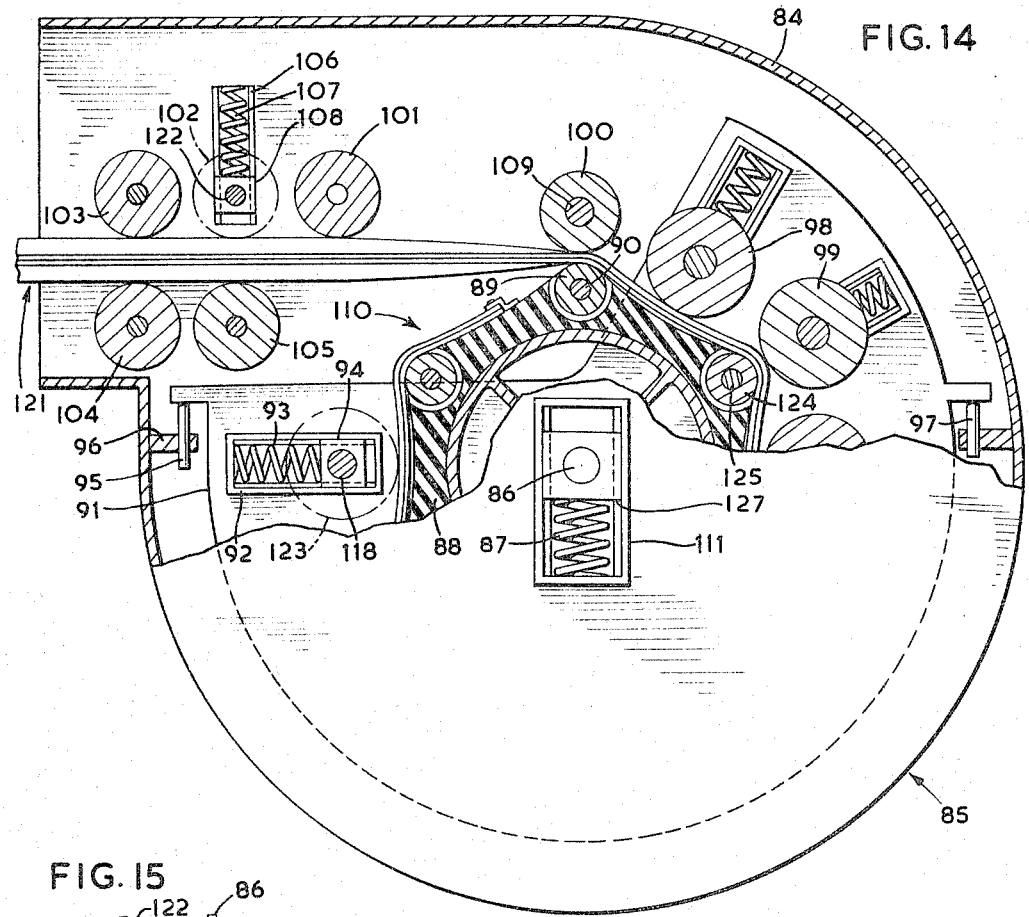

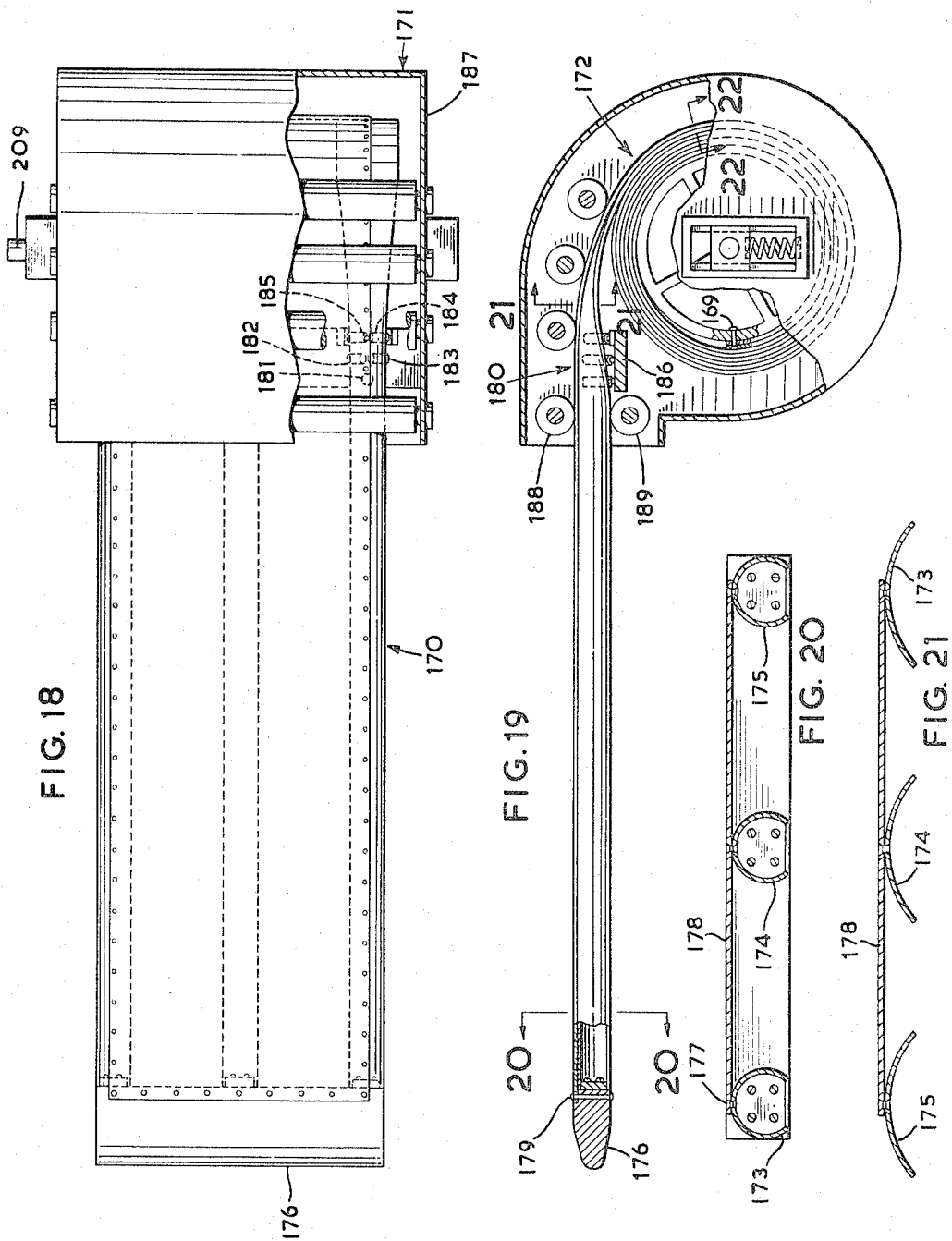

*INVENTOR.*
PETER ISAAC

United States Patent Office 3,298,142
Patented Jan. 17, 1967

3,298,142
REELABLE REVERSIBLY FLEXIBLE AND RIGID
STRUCTURAL MEMBERS
Peter Isaac, 9 Crown Hill Place, Apt. 410,
Toronto, Ontario, Canada
Filed Aug. 19, 1964, Ser. No. 391,831
24 Claims. (Cl. 52—2)

It will be declared from the outset that the invention disclosed herein is a continuation-in-part of the following abanboned patent applications:

"Retractable Roofs for Vehicles," Serial No. 259,052 filed Feb. 18, 1963. "Supple Rigid Members," Serial No. 279,520 filed May 10, 1963. "Reelable Structural Members," Serial No. 364,033 filed April 30, 1964.

One of the embodiments of the invention disclosed herein is a refinement upon a copending patent application entitled "Inflatable Structural Members," Serial No. 231,167, filed October 17, 1962 now abandoned.

My invention pertains to improvements in inflatable structural members which may be made flexible for convenience, storage or transportation and rigid when required for carrying compressive or flexural loads. This specification deals in particular with inflatable structural members which have specific external shapes when they are in the rigid state and with reelable structural members which do not require inflating means. With this invention it is possible to construct flexible components of devices and buildings, which may be made rigid when required.

The object of this invention is to provide an inflatable structural member which may be reeled for transportation and fed from the reel in a rigid state in a cantilever manner without any guidance other than from the reel, with the portion of the member projecting from the reel having a specific external shape and having the capability of carrying external loads.

A further object of this invention is to provide inflatable structural members which are made completely from metallic parts, eliminating the requirement for tubes or bladders of organic material, thereby permitting the members to be used in high temperature environments.

A still further object of this invention is to provide reelable structural members of the non-inflatable type which are stored in a flexible state on a reel but which may be fed from said reel in a structurally rigid state.

This specification purports to cover only basic principles involved and the method of constructing reelable structural members, it being understood that the possible applications are too numerous to be described in detail in this specification. However, a few applications will be listed here to indicate the usefulness of this invention. These are: air and hydrofoils which may be retracted when not required; retractable roofs and doors for vehicles and buildings which may be reeled when not required but which have the required specific external shapes when they are extended in the rigid state; and reelable linear actuators which may be used to apply forces remotely. Many other applications will be apparent when this invention is understood.

With the foregoing objects and purposes in view and such others as may become apparent as this specification proceeds, the present invention consists of the following construction and arrangement of parts, all as hereinafter more particularly described reference being had to the accompanying figures in which:

FIGURE 1 is a perspective view of an inflatable structural member projecting from the reel in the rigid state, showing details of construction of the member and storage means.

FIGURE 2 is a cross sectional view taken along the lines 2—2 of FIGURE 1 showing details of the end fitting of the inflatable structural member and details of construction of one of the inflatable structural members.

FIGURE 3 is a cross sectional view through the rigid portion of the inflatable structural member which projects from the reel showing how a specific external shape is produced by the use of auxiliary inflatable structural members.

FIGURE 4 is a cross sectional view corresponding to FIGURE 3 showing the inflatable structural member in a flexible state which it assumes while it is on the reel.

FIGURE 5 is a cross sectional view which corresponds to FIGURE 3 but illustrating an alternative embodiment of construction.

FIGURE 6 is a cross sectional view taken through the centre of the shaft of the reel shown in FIGURE 1 which illustrates the manner in which fluid is fed to the auxiliary inflatable structural members via fluid couplings from an external source.

FIGURE 7 illustrates a third embodiment of the invention showing how a specific external shape of the inflatable structural member may be achieved by using a webbed bladder.

FIGURE 8 is a cross sectional view taken along the lines 8—8 of FIGURE 7 illustrating details of construction of this embodiment.

FIGURES 1 to 8 inclusive also illustrate the essential details of reelable structural members which do not require inflating means, as described in detail in the specification.

FIGURE 9 is a part sectional view of a reelable structural member of the non-inflatable type which is specially adapted to be used as a linear actuator.

FIGURE 10 is a cross sectional view taken along the lines 10—10 of FIGURE 9 which illustrates the wedge type collapsing means used to render the member to a flexible state prior to reeling.

FIGURE 11 is a cross sectional view taken along the lines 11—11 of FIGURE 9 which illustrates the spring loaded roller collapsing means.

FIGURE 12 is a cross sectional view taken along the lines 12—12 of FIGURE 9 which illustrates the feed controlling means.

FIGURE 13 is a cross sectional view taken along the lines 13—13 of FIGURE 9 which illustrates the shape of the reelable member in the rigid state.

FIGURE 14 is a part cross sectional view of an alternative storage means taken along the lines 14—14 of FIGURE 15 which illustrates the undulated reel drum, the spring loaded roller collapsing means and the reel spring mounted in the storage means.

FIGURE 15 is a plan view of an alternative storage means for a reelable member of the inflatable and non-inflatable types.

FIGURE 16 is an enlarged view of a section of a structural member on the reel of FIGURE 14 which illustrates the principle of the elements separating from each other in the undulations of the reel drum.

FIGURE 17 is part sectional perspective view of a resilient sheet which is longitudinally more extensive and compressive than a solid sheet and may be used in lieu of sheets illustrated in the various illustrated embodiments.

FIGURE 18 is a plan view of a reelable structural member of the non-inflatable type with a broken away section of the storage means to illustrate details of the reel.

FIGURE 19 is an elevation of the embodiment illustrated in FIGURE 18 which shows further details of the storage means.

FIGURE 20 is a cross sectional view taken along the lines 20—20 of FIGURE 19 which illustrates the shape of the reelable structural member when it projects from the reel in a rigid state.

FIGURE 21 is a cross sectional view taken along the lines 21—21 of FIGURE 19 which shows the shape of the reelable structural member after it has been rendered to a reelable state by the roller spreading means.

Figure 22:
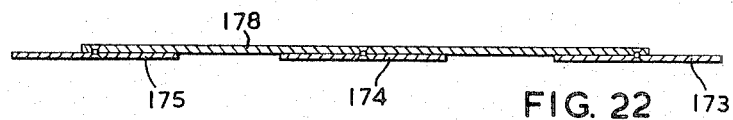

FIGURE 22 is a cross sectional view taken along the lines 22—22 of FIGURE 19 which illustrates the shape of the member in the flattened state on the reel.

Figure 23:
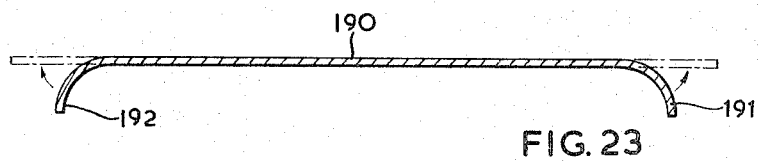

FIGURE 23 is a cross sectional view of another embodiment of a reelable member which shows the shape of the member when it is off the reel and on the reel.

Figure 24:
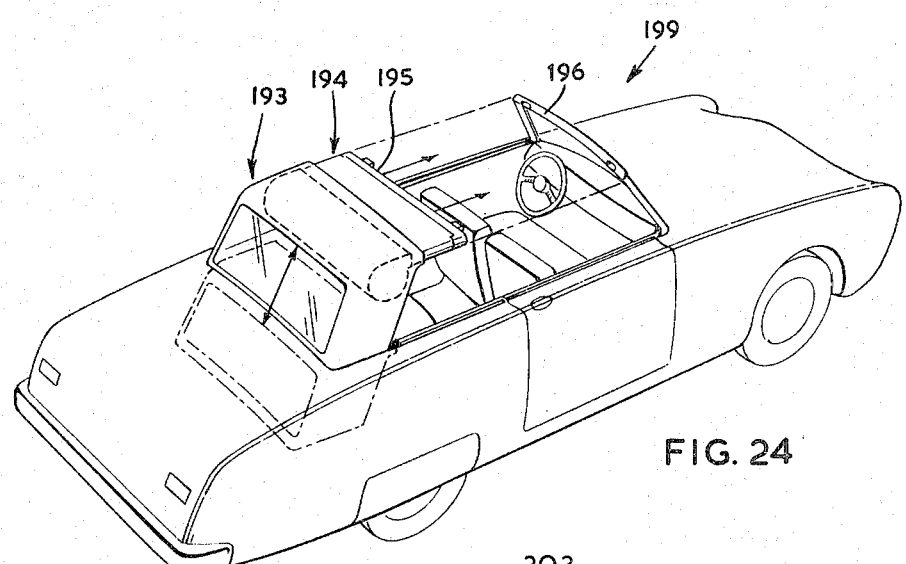

FIGURE 24 is a perspective view of an automobile illustrating the application of a reelable structural member as a retractable roof of a convertible.

Figure 25:
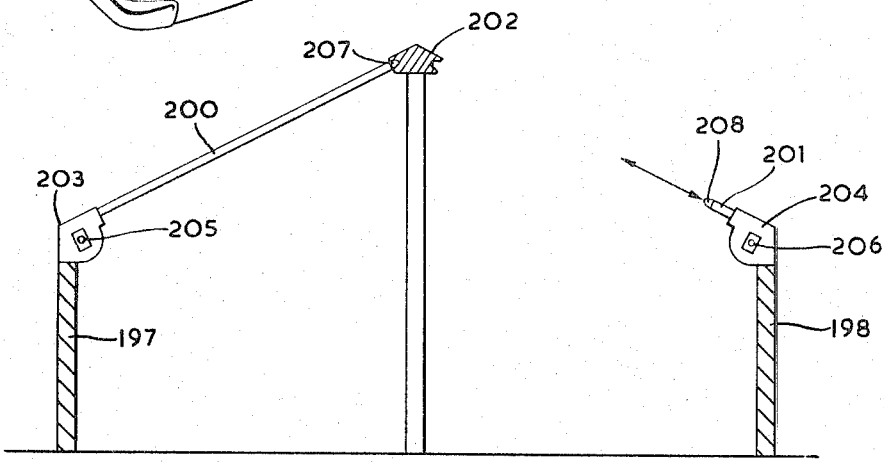

FIGURE 25 is a illustration of an application of a reelable structural member to a building, such as a stadium in the form of a retractable roof.

This invention relates to two distinct classes of reelable structural members, namely the inflatable and non-inflatable types. The basic concepts of one of the embodiments of the inflatable types of my invention are illustrated in FIGURES 1 and 6. What is presented here is an inflatable structural member 1, with the specific external shape shown in FIGURE 1, storage means 2 comprising a reel 3 on which the member may be reeled, a reel housing 73 which supports the reel 3 and fluid couplings 7 and 81 operatively connected to the reel as shown in FIGURE 6, along with reel operating means 31 comprising a square ended shaft to which a motor or actuator may be connected for operating the reel.

The basic feature of this invention involves means of producing the inflatable structural member 1 so it has a specific external shape which is an essential requirement of many applications. Describing first the embodiment illustrated in FIGURES 1 and 3, the external shape has been achieved by using shape controlling means comprising several auxiliary inflatable structural members 4, 5 and 6 which are contained within and run parallel to the inflatable structural member 1 as shown in FIGURE 1. The inflatable structural member 1 consists of two elements or sheets 13 and 14 of resilient material, such as steel, and element joining means 79. The element joining means may comprise a wire hinge 15 or welding 16 as shown in FIGURE 3. The auxiliary member, using 5 as an example comprises two auxiliary elements 8 and 9 of resilient material and auxiliary element joining means 80 which may comprise wire hinges 11 and 12, and sealing means comprising a tube 10 of supple material, such as rubber, which is contained within the member. As seen in FIGURE 2, the ends of the elements or strips 8 and 9 may be welded together at the surface 48 and the end of the tube is closed off as shown. The auxiliary members are attached within the inflatable structural member, by fastening means such as riveting or preferably by spot welding the strip 8 to the sheet 13 along the contact line 47 and by spot welding the strip 9 to the sheet 14 along the contact line 46. The other auxiliary members 4 and 6 are attached to the main member in an identical way.

The member 1 terminates in an end fitting 20 which is designed to suit the particular application of the member; as seen in FIGURE 2, the sheets 13 and 14 of the member are riveted to the end fitting 20 with the rivets 18 and 17, although other means of joining the parts such as welding may be used. The other ends of the member 1 and of the auxiliary members 4, 5 and 6 are closed off in the same manner as shown in FIGURE 2. As seen in FIGURE 6, the auxiliary members 4, 5 and 6 are attached to the drum 27 of the reel by using the fittings 50, 51 and 52 respectively.

Provision is made for inflating the auxiliary members 4, 5 and 6. The provisions for inflating auxiliary members 4 and 6 comprise a fluid coupling 7 which is connected to the shaft 19 of the reel as seen in FIGURE 6, whereby a fluid may be fed into the interior of the auxiliary members 4, and 6 via the annular passage and the coupling 7, the passageway 55 in the shaft 19 and the fluid lines 23 and 21 respectively.

All three auxiliary members shown may be inflated via the fluid coupling 7 shown. However, where required, all auxiliary members may be provided with their own inflating means. As shown in FIGURE 6, the auxiliary member 5 is inflated via the fluid coupling 81, the passageway 82 and fluid line 22.

When the fluid is fed into the auxiliary members the portions of these members protruding from the reel inflate, the portions on the reel remain deflated as seen in FIGURE 4. This is the case because the curvature of the drum 27 has already produced one curvature in the metal strips and the pressure of the fluid is insufficient to deform the strips to a double curvature. Although not shown, the sheet 13 contains vent holes thereby allowing air to enter the member 1 as it expands when the auxiliary members are inflated. The auxiliary members have longitudinal channels 75 which provide for free flow within the member when it is in a collapsed condition.

As seen in FIGURE 3 the external profile of the inflatable structural member 1 is achieved by the number of, the size and spacing of the auxiliary members, and the inflation pressures which are applied. However in each case the auxiliary members preferably are inflated to an essentially circular cross section as shown. Although the general profile of an airfoil is presented in FIGURE 3, it will be evident that many other desired profiles can be produced by using the principle described.

The profile shown in FIGURE 3 may further be changed by applying a lower fluid pressure to the auxiliary inflatable member 5, since it has an independent fluid supply via passageway 82 and fluid coupling 81. By these means a wide range of desirable profiles may be produced.

The second embodiment of an inflatable structural member is shown in FIGURE 5. The inflatable structural member comprises two elements consisting of sheets 36 and 37 of resilient material which are seam welded at the edges 38 and 39. The auxiliary members 33, 40 and 41 likewise are made from resilient metal strips. The auxiliary member 33, for example, comprises the two elements consisting of strips 32 and 67 which are seam welded at the edges 34 and 35. The strip 67 is seam welded or riveted to the sheet 36 and the strip 32 is seam welded or riveted to the sheet 37. All the auxiliary members of this embodiment are attached to the drum 27 of the reel in the same manner as shown in the first embodiment illustrated in FIGURE 6.

The third embodiment of an inflatable structural member is illustrated in FIGURES 7 and 8. The main member 58 comprises the two elements or sheets 60 and 62 which are spot welded at the edges 65 and 66. The shape controlling means of the main member comprise the bladder 59 which is bonded to the internal surfaces of the sheets 60 and 62. The bladder 59 contains webbing 61 which restricts its shape when it is inflated. The holes 63 in the webbing provide for free flow of fluid within the bladder and the fluid channels 78 provide for flow within the member when in the collapsed condition. By using the bladder, a characteristic external profile such as shown in FIGURE 8 may be produced although it will be evident that a shape such as shown in FIGURE 3 may be produced by suitable design of the webbing 61.

The preceding disclosure has shown several ways of producing inflatable structural members with specific external shapes. Such members have many interesting applications. For instance the member shown in FIGURE 1 may be used as an airfoil and the member shown in FIGURES 7 and 8 may be used as a retractable roof of a vehicle or as a retractable roof of a stadium which may be retracted during clement weather conditions.

It will be evident that many structural modifications may be made to the invention as presented. For instance, both edges of the sheets 13 and 14 of the member may be hinged. The strip 8 may be riveted to the sheet 13 at the line 47 rather than welded. The hinged auxiliary members of FIGURE 3 can be used in place of the welded auxiliary members of FIGURE 5. It will also be emphasized that the fluid coupling 7 shown in FIGURE 6 is of one of many commercially available types which could be used for this purpose.

In general the inflatable structural member 1 may be retracted upon the reel by the use of a motor or actuator attached to the square end 31 of the shaft 19. The inflatable structural member will leave the reel when the auxiliary members 4, 5 and 6 are inflated. However, the tendency for the member 1 to return upon the reel 3 may be improved by precurling the sheets 13 and 14 in the form of a spiral spring. This ensures that when the fluid pressure is released, the member will return upon the reel on its own accord, making it unnecessary to use a motor for operating the reel, although, in most applications, a motor will be used to operate the reel, both for extending and retracting the inflatable structural member from and upon the reel.

The rigidity of the portion of the inflatable structural member projecting from the reel stems from the fact that the resilient elements 13 and 14 are dished outwardly from the neutral surface of flexure which is a surface which contains the hinge 15 and joint 16. The rigidity is further augmented by the existence of the auxiliary members which in themselves are rigid when inflated due to the fact that the auxiliary resilient elements, such as 8 and 9 are dished outwardly from a neutral surface of flexure of the auxiliary member 5 which contains the hinges 11 and 12.

When the inflatable structural member 1 is returned to the storage means 2, it must first be made flexible before it can be reeled. This requires that the fluid within the auxiliary members 4, 5 and 6 must be exhausted. The fluid is preferable returned to its source, connected to the fluid couplings 7 and 81. The fluid flow within the members when on the reel is restricted and passes through the flow channels 75 shown in FIGURE 4. However, if a fluid such as air is used it may be exhausted to the atmosphere via relief valves, such as 68, shown in FIGURE 2. The air enters the valve via line 69 and leaves the member via passage 72. The valve, shown, is for illustrative purposes only and essentially comprises a poppet 70 and spring 71.

The relief valves are set at a somewhat higher pressure than required for holding the member 1 in the rigid state, the valves being set so that they release air only when the member is being returned to the storage means 2. Although only one valve is shown which communicates with the auxiliary member 5, it is evident that each auxiliary member may be equipped with its own relief valve, or all auxiliary members may be connected to one relief valve. The latter alternative may be employed when only one fluid coupling such as 7 is used.

The preceding disclosure has cited several embodiments of inflatable reelable structural members. Several embodiments will now be disclosed which require no inflating provisions. These members are normally in the rigid state and may be made flexible by the action of a reel.

The first embodiment of a reelable structural member may be understood with reference to FIGURES 1 and 3.

The resilient elements 13 and 14 are preformed or dished so that their normal state is as shown in FIGURE 3. Likewise the resilient elements 8 and 9 of the auxiliary member 5 shown in FIGURE 3 are likewise preformed so that their normal state is as shown in FIGURE 3. This may be achieved by employing alloys of high resilience well known to spring manufacturers.

The sealing means 10 serve no purpose in this embodiment and are not required. The auxiliary reelable members 4, 5 and 6 and the reelable structural member 1 shown in FIGURE 1 are in a rigid state when they are off the reel. The rigidity stems from the fact that resilient elements are predished from a neutral surface of flexure which contains the hinges of the members. By combining the above members with storage means 2 shown in FIGURE 1, the member 1 may be made flexible by compelling it to take the shape shown in FIGURE 4. This can be most readily achieved by employing a reel. A reel has an inherent property of compelling any member entering thereon to assume the curvature of the reel. In doing so it tends to flatten the member entering thereon and hence to make it flexible and reelable.

The inflating means comprising the couplings 7 and 81, passageways 55 and 82 and fluid lines 21, 22 and 23 are not required in this embodiment, although the structural auxiliary members 4, 5 and 6 may be attached to the drum by means of fittings 50, 51 and 52 respectively as shown in FIGURE 6. However breathing means must be provided for the member 1 and the auxiliary members 4, 5 and 6, since when the members enter the reel the air therein must be expelled. Sufficient breathing flow area is inherently provided at the hinges although additional breathing facilities in the form of vent holes may be provided.

The element joining means 79, FIGURE 3 may comprise a hinge 15, seam weld 16 or other means such as rivets which are not shown.

The second embodiment of a reelable structural member comprises the construction techniques shown in FIGURE 5. In accordance with the preceding discussion, the resilient elements 36 and 37 of the member shown are preformed or dished during manufacture so that FIGURE 5 represents the profile of the member in the normal state. All the element joining means such as 34 of the auxiliary member 33 preferably comprise metallurgical bonds, rivets or hinges.

Breathing provisions may comprise small vent holes in the surface of the member such as 76 and 77 shown in FIGURE 5.

The third embodiment of reelable structural members comprises the structure shown in FIGURES 7 and 8. The main member 58 comprises the two elements 60 and 62 along with element joining means which comprise the spot welds 65 and 66 or rivets which are not shown. The elements are preformed to the cross sectional shape shown in FIGURE 8. The bladder 59, is only required when the member 58 is exceptionally wide, and in applications where the member is subject to vibration. The bladder assists in damping out the vibration.

The member 58 may be employed in combination with reel storage means as previously described whereby it may be rendered to the flexible and hence reelable state.

The preceding disclosure was made with reference to storage means in their simplest form as shown in FIGURES 1 and 6. Many refinements may be made to the storage means to improve the reeling process of the structural members and these will now be described.

FIGURE 15 shows the plan view of storage means 85 which may be used to store any of the inflatable and reelable structural members already described. FIGURE 14 which is a part section through the storage means illustrates the basic concepts for easing the reeling problem. Referring to FIGURE 14, the storage means 85 essentially comprise a housing 84, a reel 110, support roller means comprising a number of rollers 101, 103, 104 and 105 which straddle the reelable member and are journalled in the housing 85, feed control means which comprise the roller 102 which is urged against the reelable member 121 and packing roller means for packing the reelable member 121 on the undulated drum of the reel. The packing roller means comprises a number of spring-loaded rollers disposed around the drum of the reel of which only the rollers 98, 99 and 123 are shown.

Before describing the storage means 85 in detail the basic principle of reeling will be described. When an inflatable structural member of the type illustrated in FIGURES 3 and 5 is reeled on a drum the inner sheets tend to compress while the outer sheets elongate. For practical purposes it is desirable to keep the diameter of the reel drum to a minimum and consequently the tendency then is for the inner sheet to buckle if a reel with a round drum is utilized. By using the undulated drum 88, the buckling action may be avoided as is clearly shown in FIGURE 16. For simplification the reelable member 121 shown is of the type illustrated in FIGURE 5 and comprises the two resilient sheets 112 and 115 and the two auxiliary sheets 113 and 114. The drum 88 has a number of rollers such as 89 and 124 on the peak points of the undulated surface, which journal on the shafts 90 and 125 respectively the shafts being attached to the drum. These rollers ease the reeling problem and a section of the drum containing these rollers is shown enlarged in FIG. 16. It will be seen in FIGURE 16 that all the sheets 112, 113, 114 and 115 separate from each other between the rollers 89 and 124 and thereby the differential length between the sheets referred to above, can be accommodated without buckling. In this type of construction, the resilient sheets 112 and 115 and the auxiliary resilient sheets 113 and 114 are joined at the edges only at points corresponding to points opposite the rollers 89 and 124 in order to permit the separation indicated to take place over the full width of the sheets.

Included in the storage means 85 are feed control means which will now be described. If the portion of the reelable member 121 is subjected to a longitudinal compression load a point of reaction must be provided to prevent the member from getting entangled on the reel. This is achieved by using the spring-loaded roller 102 which is urged against the reelable member 121. The spring force must be limited so that the member is not collapsed thereby. By attaching driving means to the shaft 122 of the roller the required reaction can be provided. The roller 102 and its shaft 122 journal in the support block 108 which is slidably restrained in a frame 106. The frame 106 is attached to the housing 84. The coiled spring 107 provides the means whereby the roller 102 is forced to engage the reelable member 121.

The packing means for packing the reelable member on the undulated drum will now be described. With reference to FIGURE 15 two plates 91 and 126 journalling on the shaft 86 of the reel are provided. The packing roller means which are disposed around the drum between the two plates, of which only the rollers 98, 99 and 123 are shown, are spring mounted on these plates such that they engage the reelable member 121 on the drum and compel it to reel in the undulations thereof for reasons already explained. A typical packing roller means comprises a roller 123, a shaft 118 which journals in the support block 94 of plate 91 and the support block of plate 126 which is not shown. The block 94 is slidably restrained in the frame 92. The frame is attached to the plate 91. The coiled spring 93 bears on the support block and hence compels the roller 123 to bear against the reelable member 121 on the drum. The plate 91 has two restraining pins 95 and 97 which prevent the plate from rotating. The pin 95 for instance slides in the projection 96 of the housing 84.

The reel 110 is preferably slidable mounted in the housing 84 of the storage means when the reelable member 121 is of considerable length. In this connection the collapsing roller 100 journalling on the shaft 109, which is attached to the housing 84, is provided. With reference to FIGURE 14 the reel shaft 86 journals in the support block 127 which is slidably restrained in the frame 111 of the housing. It will therefore be evident that the reel drum is being continuously urged against the collapsing roller 100 and when the reelable member is reeled the reel slides away from the collapsing roller to accommodate additional convolutions of the member on the reel.

Another way of easing the reeling problem may be understood with reference to FIGURE 17. A differential length between adjacent sheets has to be provided on the reel, as already explained. This may be achieved by using a sheet 116 which is longitudinally more extensive and compressive than a solid sheet. The sheet 116 comprises a resilient sheet 117 such as steel with numerous perforations 119, and a coating 120 of organic material such as rubber or plastic completely enveloping the sheet 117. Due to the holes provided the sheet 116 is more compressive and extensive than a solid sheet. Referring now to FIG. 16 the member 121 may be constructed such that sheets 113 and 115 are replaced with the sheet 116 and thereby the member is more flexible and more readily sealed. However a member thus constructed is less rigid than a member constructed solely of rigid sheets and may only be used where members of appreciable rigidity are not required. It will also be evident that the member 116 shown in FIGURE 17 is typical of members which are more extensive and compressive than solid sheets. For instance sheets made of braided or meshed wire coated in rubber may be used.

The preceding disclosure has been confined to inflatable structural members and reelable structural members which require edge joining means. Reelable structural members which require no inflation nor edge joining means and which in some applications have distinct advantages over members having edge joining means will now be described.

A device comprising a reelable structural member especially adapted to be used as a linear actuator may be understood with reference to FIGURES 9 to 13. The device comprises a structural member 128, and storage means 129 for storing said reelable member in a flexible state.

Describing first the reelable member 128 as best seen in FIGURE 13, it consists of two tubular members 159 and 160 which are tubular of their own accord but which may be flattened by the application of a spreading force in the longitudinal slits of the tubes. Attached to the end of the reelable structural member is an end fitting 140, seen in FIG. 9, to which loading means may be connected. The two tubular members are mounted back to back as seen in FIG. 13 and joined at intervals by means such as welds or rivets. The tubular members may be made of any resilient material such as steel or plastic which will restore itself to the normal shape of FIGURE 13 after the member has been flattened.

The storage means 129 include a reel 130 on which the reelable structural member may be wound, support roller means 151 for supporting the member as it projects from the storage means, collapsing means 148 for collapsing the member before it engages the reel and feed control means 162 for controlling and reacting the longitudinal load which may be imposed upon the end fitting 140.

Describing first the reel 130, it essentially comprises an undulated drum 161, a shaft 141 which may be driven by means attached thereto, and a shaft support block 142 slidably restrained in the frame 164 of the housing 163. A collapsing roller 144 is provided which journals on the shaft 145, the shaft being attached to the housing 163. It will therefore be evident that the spring 143 engages the support block 142 and forces the drum of the reel against the collapsing roller 144 and thereby retains the reelable member in the flattened state as shown in FIGURE 11 and permits successive convolutions to be accommodated on the reel.

The feed control means 162 may be best understood with reference to FIGURE 12. These generally comprise shaft-mounted rollers 139 and 150 which are mounted in the storage means. The roller 150 has a shaft 149 which extends through the housing and may be driven by means attached to the end 158 thereof. The driven roller 150 is spring loaded by two springs 138 and 167 and thereby the reelable member 128 is firmly held between the two rollers. Any compression load transmitted through the reelable member may be reacted by these rollers through the driving means attached to the end of the shaft 158. The support roller means 151 generally comprise two rollers 152 and 137 which engage the tubular members in their slits in the same manner as shown in FIG. 12.

The collapsing means 148 are best seen in FIG. 10. They generally comprise two wedges 153 and 154 which are shaped to gradually change the shape of the reelable member from the tubular shape shown in FIG. 13 to the flattened state shown in FIG. 11 as the member progresses towards the reel. After passing through the collapsing means 148 the member is completely flattened by the two rollers 146 and 147. As best seen in FIG. 11 the shaft 157 of the roller rests in support blocks 156 and 165 which are spring loaded by the springs 155 and 166 respectively, thereby continuously urging the roller 146 against the reelable member.

Referring now to my FIGURES 18 and 19 another embodiment of my invention will be described. Essentially the basic principles are the same as those utilized in FIG. 9, but the device of FIG. 18 is especially useful where relatively wide reelable members are required, as in the case of a retractable roof for a stadium. The device of FIGURE 18 generally comprises the reelable structural member 170 and storage means 171.

Describing first the reelable structural member 170 it comprises collapsible longitudinal stiffening means such as the tubular members 173, 174 and 175 shown in FIG. 20 which are made of any resilient material such as spring steel or plastic. The members are suitably attached to a rigid end fitting 176 and to a flat sheet 178 by such means as rivets 177 shown, and the flat sheet is preferably attached to the end fitting by such means as the rivets 179 as seen in FIG. 19.

The storage means 171 shown are similar to those already described with reference to FIG. 9 and all the features described with reference to the storage means of FIG. 14 may also be employed if desired.

However the novel roller spreading means 180 shown in FIGS. 18 and 19 will now be described. Before the reelable structural member 170 may be reeled, the tubular members 173, 174 and 175 must be substantially flattened. Each tubular member has its own spreading means but since all the spreading means are identical only the spreading means 180 for the tubular member 173 will be described. These generally comprise three stages of rollers, 181 being one stage, 182 and 183 the second stage and 184 and 185 the third stage. All the rollers journal on a support bracket 186 which is attached to the housing 187 of the storage means. The operation of the spreading roller means is as follows: The reelable member when extended from the storage means in a rigid state transmits its load to the housing via the support rollers 188 and 189 which span the reelable member transversely in the aperture of the housing 187. When the reel is rotated by means attached to the shaft 209 thereof in a direction such as to retract the reelable member, the tubular members are individually spread further apart by each stage of the spreading rollers to emerge therefrom with a shape somewhat as shown in FIG. 21, which permits the tubular members to be completely flattened by the reel as shown in FIG. 22.

It will be evident that the reverse process takes place when the reelable structural member is fed from the storage means, each member then restoring itself to the tubular state shown in FIG. 20.

An alternative type of reelable structural member is shown in FIG. 23. This member comprises a top sheet 190 and curled flanges 191 and 192. Although this member is shown integrally it will be evident that the curled flanges may be made of different material than the top sheet and attached thereto by riveting, welding or other fastening means. The curled flanges, however, must be made of resilient material, such that when the member is flattened as shown by the dotted outline, the flanges will restore themselves to the curled state when the flattening force is removed. The member may be stored in the storage means 171 of FIG. 18 and although not shown it will be apparent that the undulated drum, the packing roller means and feed control means described with reference to storage means illustrated in FIG. 14 may also be used with this embodiment. Likewise the sheet 178 of FIG. 22 and the sheet 190 of FIG. 23 may be replaced with the more compressive sheet of FIG. 17 to ease the reeling problem.

It will be appreciated that the invention as described has numerous applications and several of these will now be described. The reelable member of FIG. 9 may be employed as a device, such as a linear actuator. For instance by coupling a motor with reversing means to the shaft 141 of the reel, and by providing suitable coupling means to the end fitting 140, the device can perform functions similar to that of a telescopic cylinder and yet can be constructed more compactly. In this respect the device may be constructed as shown in FIGURE 18 with three tubular members 173, 174 and 175 or only one may be employed in applications where extreme compactness is required in which case the top sheet 178 is not used.

Another application of my invention is illustrated in FIG. 24. It will be evident that the reelable structural member of FIGURES 1, 8, 18 and 23 may be adapted for use as a retractable roof of a vehicle. In FIGURE 24 a convertible 199 is shown fitted with a reelable roof top 194, which may take the form of the embodiments discussed beforehand and which is stored in the roof cap 193. The roof cap may be raised and lowered by suitable means within the body of the vehicle. When the roof cap is in the raised position, as shown, the roof top may be extended by rotating the reel until the end fitting 195 engages suitable recesses in the windshield frame 196 of the vehicle.

The mechanical details required for the application of this invention to a convertible are not illustrated. since they may be similar to those described in my U.S.A. copending patent application, Serial Number 259,052, entitled "Retractable Roofs for Vehicles."

Another application of my invention may be more fully appreciated with reference to FIGURE 25. In many outdoor facilities, such as swimming pools, football stadiums and the like it is advantageous to have a roof during inclement weather conditions. A typical structure may have permanent walls 197 and 198 and roof rail 202.

Retractable roof tops 200 and 201 may be stored in the storage means 203 and 204 respectively. The storage means may be permanently attached to the top of the walls 197 and 198 respectively. By rotating the shafts 205 and 206 of the storage means 203 and 204 respectively, the roof tops may be extended and retracted as shown. In the extended position the end fittings 207 and 208 provide suitable anchoring means for the roof tops in the roof rails 202.

It should be understood that the intent of this application is to illustrate and describe the basic concepts only since numerous refinements to the invention are readily made. Furthermore numerous applications of the art taught herein are possible and although only a few of these have been mentioned and described numerous others

What I claim as my invention is:

1. An inflatable structural member, which is flexible and reelable when deflated and rigid when inflated, at least including, in combination, two resilient elements which are predominantly flat and parallel to each other when said inflatable structural member is in a flexible state and dished outwardly from each other when said inflatable structural member is in a rigid state, element joining means which include one end fitting at one end of said inflatable structural member, said resilient elements being attached to said end fitting, and hinge means joining said resilient elements to each other along at least one pair of opposite edges, inflating means whereby said inflatable structural member may be inflated and deflated, shape controlling means for defining the external shape of said inflatable structural member when inflated, said shape controlling means limiting the extent to which said resilient elements dish from each other, said inflatable structural member becoming rigid when inflated due to at least a portion of said resilient elements dishing outwardly from each other, said inflatable structural member restoring itself to a flexible state when it is deflated due to the action of said resilient elements.

2. An inflatable structural member, which is flexible and reelable when deflated and rigid when inflated, at least including, in combination, two resilient elements which are predominantly flat and parallel to each other when said inflatable structural member is in a flexible state and dished outwardly from each other when said inflatable structural member is in a rigid state, element joining means, shape controlling means for defining the external shape of said inflatable structural member when inflated, said shape controlling means comprising at least one auxiliary inflatable member which is located between and attached to said resilient elements and oriented parallel to the longitudinal axis thereof, said auxiliary inflatable member including two auxiliary resilient elements which are predominantly flat and parallel to each other when said inflatable structural member is deflated and dished from each other when inflated, sealing means for retaining fluid between said auxiliary resilient elements when said auxiliary inflatable member is inflated, inflating means for inflating and deflating said auxiliary inflatable member, said auxiliary inflatable member controlling the extent of dishing of said resilient elements from each other and thereby controlling the shape of said inflatable structural member, said inflatable structural member becoming rigid when inflated due to at least a portion of said resilient elements dishing outwardly from each other, said inflatable structural member restoring itself to a flexible state when it is deflated due to the action of said resilient elements.

3. The inflatable structural member of claim 2 in which said auxiliary resilient elements are hinged at two opposite edges and said sealing means comprise a tube of supple material which is confined between said auxiliary resilient elements.

4. The inflatable structural member of claim 2 in which said auxiliary resilient elements are joined by bonding at least at one pair of opposite edges.

5. A device which includes an inflatable structural member and storage means for storing said inflatable structural member in a flexible state and projecting it in a structurally rigid state and cantilever manner, said storage means including a reel on which said inflatable structural member may be reeled and to which it is attached, means for housing and supporting said reel, means for inflating and deflating said inflatable structural member, and reel operating means whereby said reel may be rotated and said inflatable structural member extended and retracted from said storage means, said inflatable structural member including, in combination, two resilient elements which are predominantly flat and parallel to each other when said inflatable structural member is on said reel, and dished outwardly from each other when said inflatable structural member is inflated and projects from said storage means, said resilient elements being hinged together at least at one pair of opposite edges, shape controlling means for defining the external shape of said inflatable structural member when inflated, said shape controlling means limiting the extent to which said resilient elements dish from each other, the portion of said inflatable structural member projecting from said storage means being rigid when inflated due to said resilient elements in that portion dishing outwardly from each other, said inflatable structural member being capable of restoring itself to a flexible state when it is deflated, due to the action of said resilient elements.

6. A device which includes an inflatable structural member and storage means for storing said inflatable structural member in a flexible state and projecting it in a structurally rigid state and cantilever manner, said storage means including a reel on which said inflatable structural member may be reeled and to which it is attached, means for housing and supporting said reel, means for inflating and deflating said inflatable structural member, and reel operating means whereby said reel may be rotated and said inflatable structural member extended and retracted from said storage means, said inflatable structural member including, in combination, two resilient elements which are predominantly flat and parallel to each other when said inflatable structural member is in a flexible state on said reel, and dished outwardly from each other when said inflatable structural member is inflated and projects from said storage means, element joining means, shape controlling means for defining the external shape of said inflatable structural member when inflated, said shape controlling means comprising a bladder of supple material which is confined between said resilient elements and attached thereto, said bladder including webbing for limiting the extent of inflation of said bladder and, hence, of said inflatable structural member and thereby defining its shape, said inflating means providing the means whereby said bladder is inflated and deflated.

7. A device which includes an inflatable structural member and storage means for storing said inflatable structural member in a flexible state and projecting it in a structurally rigid state and cantilever manner, said storage means including a reel on which said inflatable structural member may be reeled and to which it is attached, means for housing and supporting said reel, means for inflating and deflating said inflatable structural member, and reel operating means whereby said reel may be rotated and said inflatable structural member extended and retracted from said storage means, said inflatable structural member including, in combination, two resilient elements which are predominantly flat and parallel to each other when said inflatable structural member is in a flexible state on said reel, and dished outwardly from each other when said inflatable structural member is inflated and projects from said storage means, element joining means, shape controlling means for defining the external shape of said inflatable structural member when inflated, said shape controlling means comprising at least one auxiliary inflatable member which is located between said resilient sheets and attached thereto, said auxiliary inflatable member comprising two auxiliary resilient elements which are predominantly flat and parallel to each other when said inflatable structural member is in a flexible state and dished from each other when in a rigid state, auxiliary element joining means, sealing means for retaining fluid between said auxiliary resilient elements when said auxiliary inflatable member is inflated, said inflating means being the means whereby said auxiliary inflatable member is inflated and deflated, said auxiliary inflatable member controlling the extent of dishing of said resilient elements from each other and thereby controlling the shape of said inflatable structural member.

8. The device of claim 7 in which at least one auxiliary resilient element is longitudinally more extensive and compressive than said other resilient element of said auxiliary inflatable member.

9. The device of claim 7 in which said auxiliary resilient elements are hinged at two opposite edges and said sealing means comprises a tube of supple material which is confined between said auxiliary resilient elements, said inflating means being the means whereby said auxiliary inflatable member is inflated.

10. The device as set forth in claim 7 in which said auxiliary resilient elements are joined together by a metallurgical bond at least at one pair of opposite edges.

11. A device which at least includes the combination of a reelable structural member and storage means for storing said reelable structural member in a flexible state and projecting it in a rigid state and cantilever manner, said reelable structural member including two resilient elements, which are predominantly flat and overlie each other when said reelable structural member is in said storage means, and dished outwardly from each other when said reelable structural member projects from said storage means in a rigid state, said rigid state stemming from said resilient elements dishing outwardly from each other of their own accord, element joining means for joining said resilient elements to each other along the longitudinal edges, said storage means including a reel on which said reelable structural member may be reeled, said reelable structural member being attached to said reel, a reel housing supporting said reel and means for rotating said reel.

12. A device which includes the combination of a reelable structural member and storage means for storing said reelable structural member in a flexible state and projecting it in a rigid state and cantilever manner, said reelable structural member including two resilient elements which are predominantly flat and parallel to each other when said reelable structural member is in said storage means and dished outwardly from each other when said reelable structural member projects from said storage means in a rigid state, said rigid state stemming from said resilient elements dishing outwardly from each other of their own accord, element joining means comprising hinge means for joining said resilient elements to each other along at least one pair of opposite edges, said storage means including a reel on which said reelable structural member may be reeled, said reelable structural member being attached to said reel, a housing supporting said reel, and means for rotating said reel.

13. A device which includes the combination of a reelable structural member and storage means for storing said reelable structural member in a flexible state and projecting it in a rigid state, said reelable structural member including two resilient elements which are predominantly flat and parallel to each other when said reelable structural member is in said storage means and dished outwardly from each other when said reelable structural member projects from said storage means in a rigid state, said resilient elements dishing outwardly from each other of their own accord, element joining means for joining said resilient elements to each other along the edges, said inflatable structural member having at least one auxiliary structural member which is located between and attached to said resilient elements and oriented parallel to the longitudinal axis thereof, said auxiliary structural member including a pair of auxiliary resilient elements which are predominantly flat and parallel to each other when said reelable structural member is in said storage means and dished outwardly from each other when said reelable structural member projects from said storage means, and auxiliary element joining means for joining opposite edges of said auxiliary resilient elements, said storage means including a reel on which said reelable structural member may be reeled, said reelable structural member being attached to said reel, a housing supporting said reel and means for rotating said reel.

14. The device of claim 13 in which said auxiliary element joining means comprises hinge means joining at least one pair of opposite edges of said auxiliary resilient elements.

15. The device as set forth in claim 13 in which said auxiliary element joining means comprises a metallurgical bond between at least one pair of opposite edges of said auxiliary resilient elements.

16. The device of claim 13 in which one of said auxiliary resilient elements is longitudinally more extensive and compressive than the other said auxiliary resilient element.

17. In a device, which includes linear actuators, retractable roofs and airfoils, which comprises the combination of a reelable member and storage means from which said reelable member may be extended and retracted in a structurally rigid state, the said storage means which include a reel with an undulated drum on which said reelable member is wound, packing roller means and packing roller displacement means for urging said packing roller means against said reelable member while it is on said drum, and housing means for supporting said reel, said packing roller means and said packing roller displacement means.

18. In the device of claim 17 in which said packing roller displacement means comprises springs.

19. In a device, which includes linear actuators, retractable roofs and airfoils, which comprises the combination of a reelable member and storage means from which said reelable member may be extended and retracted in a structurally rigid state, the said storage means which at least include a reel on which said reelable member may be wound, housing means supporting said reel, collapsing roller means in engagement with said reelable member, said collapsing roller means being supported by said housing means, said reel being slidably disposed within said housing means, and reel displacement means urging said reel against said collapsing roller means.

20. The device of claim 19 in which said reel displacement means comprises springs.

21. In the device of claim 19 in which the drum of said reel is undulated and which in addition includes spring loaded packing roller means supported by said housing means which engage said reelable member when it is on said drum and urge it to reel on said undulated drum.

22. In the device of claim 21 in which said packing roller means are supported by two plates, said plates being slidably disposed within said housing.

23. In a device, which includes linear actuators, retractable roofs and retractable airfoils, which comprises the combination of a reelable member and storage means from which said reelable member may be extended and retracted in a structurally rigid state, the said storage means which include a reel on which said reelable member may be wound, housing means supporting said reel, support roller means in engagement with said reelable member and supporting it when extended from said storage means, and feed controlling means comprising spring loaded roller means, supported by said housing means, for controlling the feed of said reelable member while it is being reeled and loaded longitudinally, and means for rotating said roller means.

24. A device, which includes retractable roofs for vehicles, buildings and the like, which at least includes the combination of a reelable structural member and storage means for storing said reelable structural member in a flexible state and projecting it in a structurally rigid state and in a cantilever manner, said reelable structural member at least comprising a sheet, collapsible stiffening means which are oriented parallel to the longitudinal axis of said sheet and attached to said sheet to distend therefrom on the portion of said reelable structural member which projects from said storage means and to collapse thereon on the portion of said reelable structural member in said storage means, said storage means at least including a reel on which said reelable structural member is reeled and to which it is attached, housing means for supporting said reel, and reel rotating means whereby the length of said reelable structural member protruding from said storage means may be varied.

References Cited by the Examiner
UNITED STATES PATENTS

| | | | |
|---|---|---|---|
| 1,806,859 | 5/1931 | Mattei | 114—117 |
| 2,915,632 | 6/1933 | Marks | 242—86 |
| 2,947,392 | 2/1934 | Gunterman et al. | 52—108 |
| 2,028,060 | 1/1936 | Gilbert | 52—2 |
| 2,212,128 | 8/1940 | Richter | 137—557 |
| 2,689,812 | 9/1954 | Mollica et al. | 52—2 X |
| 2,838,341 | 6/1958 | Watson | 52—2 X |
| 2,852,216 | 9/1958 | Peters | 137—355.23 X |
| 3,035,779 | 5/1962 | Convis | 239—534 X |
| 3,078,940 | 2/1963 | Rolle | 180—7 |
| 3,084,961 | 4/1963 | Merriman | 285—242 |
| 3,144,104 | 8/1964 | Weir et al. | 52—108 |
| 3,144,215 | 8/1964 | Klein | 242—54 |
| 3,170,471 | 2/1965 | Schnitzer | 52—2 |
| 3,172,166 | 3/1965 | Imbrecht | 52—2 X |

FRANK L. ABBOTT, *Primary Examiner.*

R. S. VERMUT, *Assistant Examiner.*